United States Patent
Dole

(10) Patent No.: US 7,730,062 B2
(45) Date of Patent: Jun. 1, 2010

(54) CAP-SENSITIVE TEXT SEARCH FOR DOCUMENTS

(75) Inventor: Bryn Dole, Sunnyvale, CA (US)

(73) Assignee: Topix LLC, Palo Alto, CA (US)

( * ) Notice: Subject to any disclaimer, the term of this patent is extended or adjusted under 35 U.S.C. 154(b) by 377 days.

(21) Appl. No.: 11/755,424

(22) Filed: May 30, 2007

(65) Prior Publication Data

US 2008/0033931 A1 Feb. 7, 2008

Related U.S. Application Data

(60) Provisional application No. 60/821,129, filed on Aug. 1, 2006.

(51) Int. Cl.
*G06F 7/00* (2006.01)
*G06F 17/30* (2006.01)

(52) U.S. Cl. ..................... 707/729
(58) Field of Classification Search ............. 707/3; 715/202; 704/9
See application file for complete search history.

(56) References Cited

U.S. PATENT DOCUMENTS

| | | | |
|---|---|---|---|
| 5,685,003 A * | 11/1997 | Peltonen et al. ........... | 715/202 |
| 5,694,559 A | 12/1997 | Hobson | |
| 6,038,560 A | 3/2000 | Wical | |
| 2002/0022956 A1 * | 2/2002 | Ukrainczyk et al. ........ | 704/9 |
| 2005/0102276 A1 * | 5/2005 | Dinh et al. ............... | 707/3 |
| 2005/0222983 A1 * | 10/2005 | Schwedes ................. | 707/3 |
| 2005/0278283 A1 * | 12/2005 | Burckart et al. .......... | 707/1 |

OTHER PUBLICATIONS

International Preliminary Report on Patentability of Feb. 9, 2009 for Internataional Application No. PCT/US2007/069927, 8 pages.
International Search Report and Written Opinion of the International Searching Authority in International Application PCT/US2007/069927, European Patent Office, Nov. 21, 2007, 12 pages.
New Features on Lexis and Nexis: Frequency Searching, Capitalization and Pluralization; Michelle Quigley; Online (http://portal.acm.org/citation.cfm?id=179994); Mar. 1994; pp. 56-61.

* cited by examiner

*Primary Examiner*—James Trujillo
*Assistant Examiner*—Pavan Mamillapalli
(74) *Attorney, Agent, or Firm*—Mahamedi Paradice Kreisman LLP

(57) ABSTRACT

Enabling text searching that accommodates a search criteria corresponding to a capitalization characteristic. One or more search terms are received, and a determination is made as to a capitalization characteristic of at least one search term. One or more documents are identified from a collection of documents. The identification is based at least in part on the determination of the capitalization characterization of the search term, so that the search result satisfies the criteria of the capitalization characteristic.

6 Claims, 3 Drawing Sheets

CAP-SENSITIVE TEXT SEARCH FOR DOCUMENTS

RELATED APPLICATIONS

This application claims benefit of priority to Provisional U.S. Patent Application No. 60/821,129, filed Aug. 1, 2006, entitled CAP-SENSITIVE TEXT SEARCH FOR DOCUMENTS; the aforementioned priority application being hereby incorporated by reference in its entirety.

TECHNICAL FIELD

The disclosed embodiments relate generally to the field of text searching and retrieval.

DETAILED DESCRIPTION

Overview

Figure 1A:
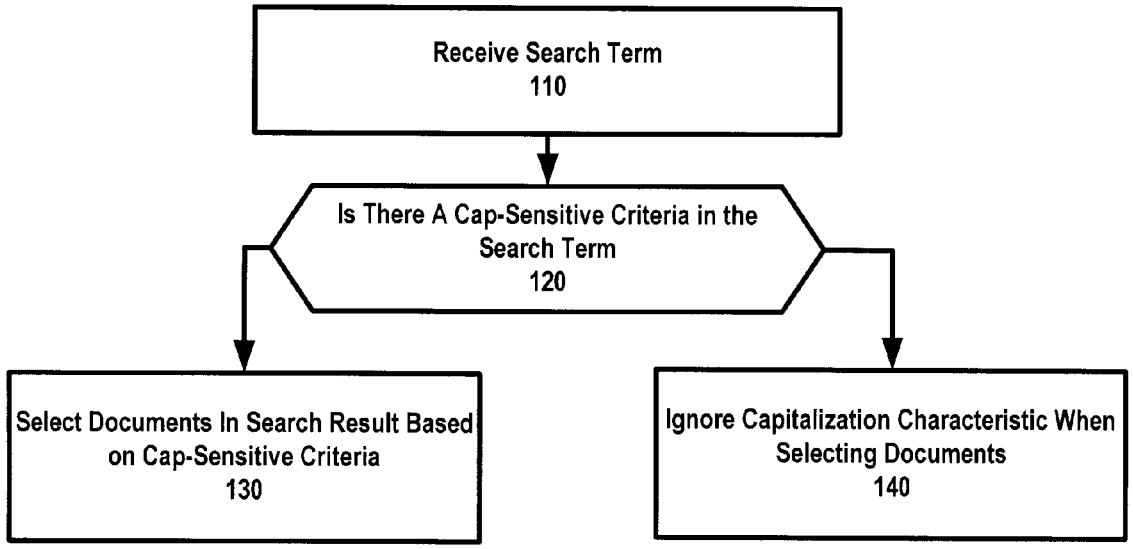
FIG. 1A illustrates a method for searching for documents using capitalization characteristics, under an embodiment of the invention.

A capitalization-sensitive ("Cap-sensitive") search is a feature that provides the ability to specify as search criteria both a term and a capitalization characteristic or signature of the term. There are conventional approaches that enable a capital-sensitive approach to be performed from within a document. For example, MICROSOFT® WORD enables an individual to perform a Find function when a document is opened. The Find function is used to find a specific character string in the document. The user can optionally make the search string "cap-sensitive", to eliminate occurrences of the character string that do not have the specific capitalization characteristic.

Embodiments described herein provide enable text searching that accommodates a search criteria corresponding to a capitalization characteristic. In one embodiment, one or more search terms are received, and a determination is made as to a capitalization characteristic of at least one search term. One or more documents are identified from a collection of documents. The identification is based at least in part on the determination of the capitalization characteristic of the search term, so that the search result satisfies the criteria of the capitalization characteristic.

In another embodiment, a system is provided for performing a text search. In one embodiment, an index stores a plurality of entries, where each entry in the index corresponds to a text item of a particular document in a larger collection of documents. At least some of the entries include information about a capitalization characteristic of a corresponding text item so as to enable a search operation that is specific to a capitalization criteria of the search operation.

In another embodiment, a search interface is provided in connection with the index to handle a request that includes the capitalization criteria.

Still further, a document retrieval component is configured to access local or network locations to retrieve and scan documents for text items (e.g. words) that correspond to entries that are to populate the index.

Embodiments described herein provide a mechanism by which cap-sensitive searches can be performed in various environments that utilize indexes or similar data structures to aggregate words and search terms from various sources.

Additionally, an embodiment enables the cap-sensitive search to be performed for a text item that occurs in any one of a plurality of source documents.

Still further, an embodiment employs a cap-sensitive search for use in a search engine on a network, such as at a search engine web site.

One or more embodiments described herein may be implemented through the use of modules or software/logic components. A module refers to a program, a subroutine, a portion of a program, a software component, firmware or a hardware component capable of performing a stated task or function. A module can exist on a hardware component such as a server independently of other modules, or a module can exist with other modules on the same server or client terminal, or within the same program. A module may be implemented on a client or on a server, or distributed between clients, servers, or amongst a client-server.

Furthermore, one or more embodiments described herein may be implemented through the use of instructions that are executable by one or more processors. These instructions may be carried on a computer-readable medium. Services and components illustrated by figures in this application provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Methodology

FIG. 1A illustrates a method for performing a cap-sensitive search, under one or more embodiments of the invention. In a step 10, a search term is received from a user. For example, the search term may be specified by a user operating a terminal over the Internet. The search request may correspond to a word, phrase, portion of a word, acronym, proper noun, or other character string that includes or does not include capitalization. In providing the search term, the user may enter characters through use of a web browser or interface, or alternative, through use of client application.

Step 120 provides that a determination is made as to whether the search term includes a capitalization characteristic. Under one or more embodiment, the capitalization characteristics that may be detected include (i) a word or term that includes all capitalization ("all caps"), or (ii) a word or term that has one character capitalized, or is partially capitalized. As described with one or more embodiments, the types of capitalization may be classified or grouped. Alternatively, the capitalization of a term may be specific to the position and characters that are capitalized.

If the determination of step 120 is that a capitalization characteristic is present in the search term, then step 130 provides that a selection is made for one or more documents that include (i) a matching or qualifying text item (ii) having a capitalization characteristic that satisfies the capitalization characteristic specified in the search term. Under one embodiment, the capitalization characteristic that satisfies that of the search term may be an exact match. For example, the search term "Bush" may return documents that include "Bush", but not "BUSH" or "bush". Alternatively, the capitalization characteristic of the text item that satisfies the criteria of the search may simply match to a capitalization class that is specified to be a match. For example, "McDonald" as a search term may be matched to a class of text items that include the characters with any letter capitalized (e.g. MCDONALD or McDONALD).

If the determination of step 120 is that a capitalization characteristic is not present in the search term, then step 140 provides that a selection is made for one or more documents that include a matching or qualifying text item. In one embodiment, matching or qualifying text items may or may not include a capitalization characteristic. For example, the search "mit" would return documents containing "MIT" or "Mit" or "mit", and the search term "MIT" would return only documents containing "MIT". Alternatively, one embodiment provides that the matching or qualifying text item does not include any capitalization characteristic. Thus, "mit" would return documents containing "mit" but not "MIT".

Embodiments described herein include a technique for enabling a capitalization-sensitive search to be performed on text content. Under one embodiment, one or more search terms are received. A determination is made as to a capitalization characteristic of at least a first of the one or more search terms. From a plurality of documents, one or more documents are identified based at least in part on the determination of the capitalization characteristic.

Figure 1B:
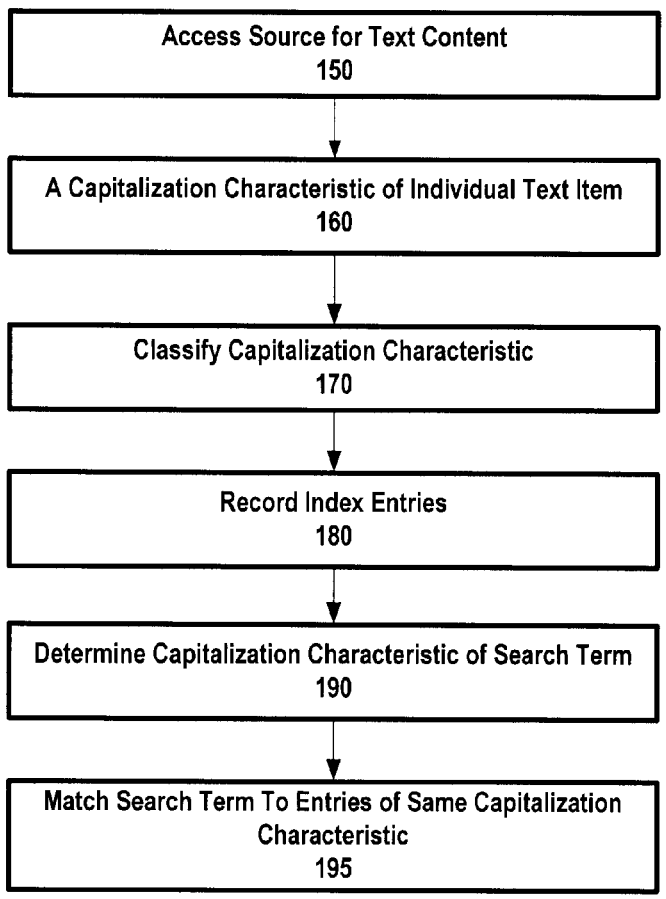
FIG. 1B illustrates a method for aggregating or formulating an index for a system that can handle search operations that include criteria that specifies one or more capitalization characteristics, under an embodiment of the invention.

FIG. 1B illustrates a method for aggregating or formulating an index for a system that can handle search operations that include criteria that specifies one or more capitalization characteristics, under an embodiment of the invention. A method such as described with FIG. 1B may be used to identify documents that contain text items that satisfy a criteria that also specifies a capitalization characteristic.

In a step 150, a source for text content (e.g. document) is accessed. The text content is scanned for text items, such as words. Such a process may correspond to tokenizing a stream of text. The resulting text items may correspond to words or even phrases.

In scanning the text content, step 160 provides that a capitalization characteristic of individual text items is determined. In one embodiment, the presence of one or more capital letters is determined from the text.

In step 170, the capitalization characteristic determined from step 160 is classified into one of a plurality of groups. In one embodiment, three classes of capitalization characteristics are used: (i) a class of no capitalization in the text item, corresponding to none of the letters or characters that comprise the text are capitalized; (ii) a class of partial capitalization in the text item, in which some, but not all the characters that comprise the text item are capitalized; and (iii) a class of all capitalization in the text item, in which all the characters in the text item are capitalized. One or more embodiments contemplate additional classes that can be used, such as a class to distinguish when there is only one capitalized letter is positioned at the beginning of the word.

In step 180, entries are recorded in the index to associate text items to the source (or portions thereof) that contained the text items. The index can then be used to find entries that match a search term, and identify documents or other text content associated with the entries that match the search term. In an embodiment, the entries reflect or record the class of the capitalization characteristic for individual text items. According to one embodiment, the entries reflect or record the class of the capitalization characteristic by having duplicative entries to reflect the capitalization characteristic of a text item that has capitalization. One embodiment provides that (i) text items with the classification of no capitalization has only one entry reflecting the text item with no capitalization; (ii) text items with the classification of partial capitalization have two entries-one entry reflecting the text item with partial capitalization and one entry reflecting the text item with no capitalization; and (iii) text items with the classification of complete or all capitalization have three entries-one entry to reflect the text item with no capitalization, one entry reflecting the text item with partial capitalization, and one entry reflecting the text item with all capitalization.

In this way, when the search term is received, step 190 provides that the class of the capitalization characteristic of the search term is determined. Thus, in an embodiment such as described above, the search term may be classified as having no capitalization, partial capitalization, or all capitalization.

Step 195 provides that the search term is matched to entries of the same capitalization class. Thus, if the search term specifies no capitalization characteristic, only those entries that are of the no capitalization class are used in the comparison operation. But because duplicative entries are used to reflect capitalization, the documents that contain the same term in any form of capitalization (including all capitalization) are returned in the search result. Likewise, if the search term contains an all capitalized term, only entries of the class of all capitalization will be compared against. It follows that the document that is returned will have the search term in the same all capitalization form.

A method such as described with FIG. 1B may be used to develop an index containing entries for search operations. The entries of the index may reflect capitalization characteristics, and in turn, enable search operations that have some sensitivity to capitalization. Additional details of such an index, and a system for implementing the index, are provided below in more detail.

System Description

Figure 2:
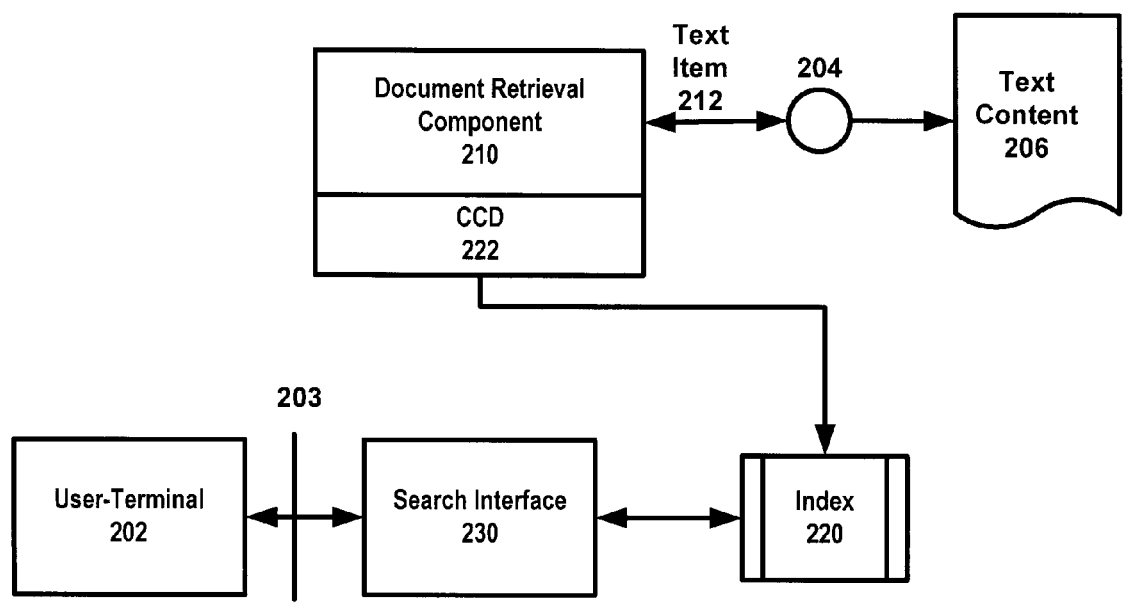
FIG. 2 illustrates a system for enabling the searching for documents using capitalization characteristics, under an embodiment of the invention.

FIG. 2 illustrates a system for enabling a cap-sensitive search to be performed for documents and other text sources available on a network, under an embodiment of the invention. In an embodiment of FIG. 2, a system includes a document retrieval component 210, an index 220, and a search interface 230. The document retrieval component 210 accesses different network sites 204 or locations for content. Examples of network sites include web sites on which text content 206 is provided, including blogs, and message boards. Text content 206 are identified and retrieved from different sources 206 that contain such content. A user terminal 202 may communicate with the system via a network connection 203. For example, the search interface 230 may include a component that is in the form of a web page that downloads on the terminal when the user navigates to a particular web site using a web page.

In an embodiment, a capitalization characteristic determinator (CCD) 222 executes with or in association with the document retrieval component 210. The document retrieval component 210 tokenizes a stream of text that is identified from the text item 212. From the tokenization process, tokens of text are identified. Under one implementation, the text tokens may correspond to words or other discrete character strings. The CCD 222 inspects the text tokens to determine whether any of the tokens have capitalization. For example, ASCII or other text data embedded in the text content 212 may be flagged when determined to be in capitalized form.

The document retrieval component 210, including the output of the CCD 222, store entries in the index 220. In one embodiment, each entry corresponds to a word or other text token. In addition, information about the capitalization characteristic of the text token is stored in the index 220. According to one or more embodiments, when a text tokens are identified to contain capitalization, multiple entries are stored in the index 220 for that token. More specifically, one entry corresponds to the word/token with no capitalization characteristic, while at least one other entry reflects use of the token/word as part of a capitalization class (e.g. all-cap, or proper noun etc.) As described with FIG. 2, index 220 may be structured to provide a schema or hierarchy defining the treatment of capitalization characteristics in the tokens.

In one embodiment, when capitalization is identified from a token, multiple entries for that token are created. One embodiment provides a first entry for use of the token as a word or other character string with no capitalization characteristics. Another entry provides for use of the token as a word or character string with some information or classification of the capitalization characteristic. For example, the second entry may carry the exact capitalization characteristic as provided by the source text content 212, and a class designation that defines whether the capitalization characteristic is either (i) an all-cap form, (ii) proper noun form (i.e. first character is capitalized) or (iii) some other capitalization. In another embodiment, the classification of the capitalization characteristic is one of either a designation of the all-cap form, or any other form with capitalization. Numerous other variations are also possible.

While embodiments such as described by FIG. 2 provide for a network environment, other variations are contemplated in which the network environment may be omitted entirely or in part. For example, the document retrieval component 110, or its equivalent, may operate on a local data source, such as a personal computer. Index 120 may include entries from documents that are both local or on the network sites, or alternatively just local. Furthermore, while an embodiment such as described with FIG. 2 describes the search interface 230 as being a web page that is downloaded on the user terminal 202, the particular location of the search interface 230 or the index 220 may vary between client and server. In a stand-alone variation, the search interface 230 corresponds to an application that executes on the terminal 202 and operates on an index of local documents and content. Numerous other variations are also contemplated.

Figure 3A:
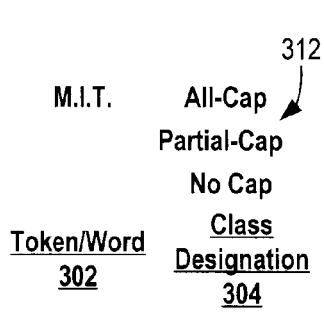
FIG. 3A-3C illustrate a schema for classifying identified words and tokens for subsequent searching, based on capitalization characteristics, under an embodiment of the invention.
Figure 3B:
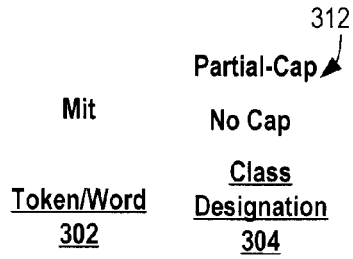
Figure 3C:
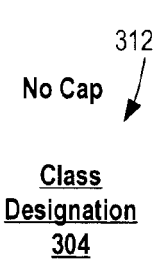

FIG. 3A-FIG. 3C illustrate the use of one schema for identifying and recording the presence of capitalization characteristics in an identified text token of a document, under one or more embodiments of the invention. In FIG. 3A-3C, an identified token 302 is provided one or more entries, depending on the capitalization characteristic of the token 302. Under one embodiment, each identified entry 312 may have between one and three class designations 304. A separate class designation 304 may be provided for the case where (i) the token has each character in a capitalized form, (ii) the token has at least one, but less than all characters in a capitalized form, and (iii) the token has no characters in the capitalized form. In other variations, more of fewer class designations may be defined, such as classes the distinguish when only the first letter is capitalized, as opposed to an alternative set of lettering in the token.

In FIG. 3A, the identified token 302 (MIT) has only capitalization in its lettering, matching the all-cap class designation. According to a schema such as shown, the all-cap characteristic results in separate entries 304 for each defined class of capitalization (all cap, partial cap and no cap). Each of the entries 304 is stored in the index 220 (FIG. 2) to point to the document where the token in all-cap form was identified.

FIG. 3B provides a proper noun usage, which under the schema described, corresponds to the partial cap designation. The entries 304 are provided the partial-cap and no-cap designations, but not the all-cap designation. Each of the two entries is stored in the index 220 (FIG. 2), and point to the document where the token in the partial cap form was identified.

In FIG. 3C, a non-cap usage is shown. Only one entry 304 is provided in the index 220 (FIG. 2), and it points to the document where the token in the non-cap form was found.

Figure 4:
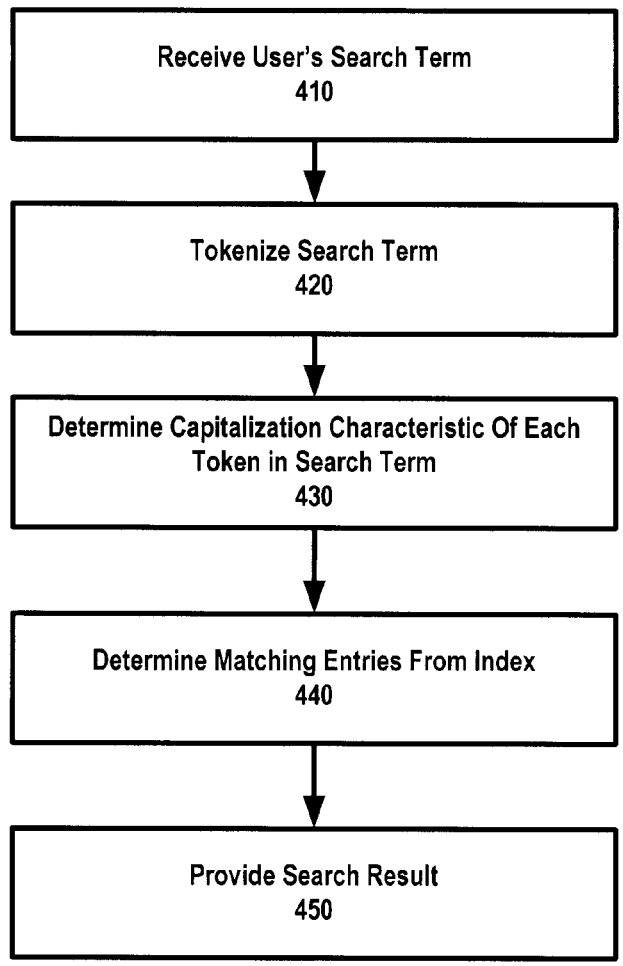
FIG. 4 illustrates a method for enabling searching of documents through use of search criteria that may include capitalization characteristics, under an embodiment of the invention.

FIG. 4 illustrates a method for performing a search using a schema such as shown and described with FIG. 3A-3C, under one or more embodiments of the invention. In FIG. 4, a step 410 provides that a user's search term is entered. For example, the search interface 230 (FIG. 2) may receive the search term from the user.

Step 420 provides that the search term is tokenized, similar to how the text content from the various sources are tokenized. As a result, words or phrases or identified from the user's search term.

In step 430, the capitalization characteristic of each token in the search term is determined. Referencing an embodiment of FIG. 3A-FIG. 3C, step 440 provides that one or more matching entries are selected from the index 220 (FIG. 2). In step 450, a search result is provided identifying or including documents that satisfy the search term and a capitalization criteria or condition specified therein. As a result of the creation of multiple entries reflecting different capitalization characteristics (as described with FIG. 3A-3C), the use of multiple entries to reflect cap-sensitivity results in the following matches:

| Search Term: | Result |
|---|---|
| mit | documents containing "mit" AND documents containing "Mit" AND documents containing "MIT" |
| Mit | documents containing "MIT" AND documents containing "Mit" |
| MIT | documents containing only "MIT" |

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for performing a text search, the method comprising:

performing a case-sensitive search of a plurality of documents by determining a class of a capitalization characteristic of a search term and using the class to identify documents in a library that contain individual terms with corresponding capitalization characteristics of the class, the case-sensitive search comprising:

receiving one or more search terms;

making a determination of whether each character in each of the one or more search terms is capitalized;

determining, based on the capitalization of each character in each of the one or more search terms, a capitalization characteristic class, of a set of two or more capitalization characteristic classes, for each of the one or more search terms; and identifying, from a plurality of documents, one or more documents based at least in part on the determination of the capitalization characteristic class for each of the one or more search terms, wherein a first capitalization characteristic class, of the set of two or more capitalization characteristic classes, is associated with search terms having all lower case letters, wherein a second capitalization characteristic class, of the set of two or more capitalization characteristic classes, is associated with search terms having all upper case letters, wherein identifying comprises, for a particular search term in the first capitalization characteristic class, identifying, from the plurality of documents, each document that comprises one or more of: (a) the particular search term in all upper case, (b) the particular search term in all lower case, and (b) the particular search term having at least one character in upper case and at least one character in lower case, and wherein identifying comprises, for a particular search term in the second capitalization characteristic class, identifying, from the plurality of documents, each document that comprises the particular search term in all upper case, wherein the set of two or more capitalization characteristic classes includes a third capitalization characteristic class, wherein the third capitalization characteristic class is associated with search terms having at least one character in upper case and at least one character in lower case, and wherein identifying comprises, for a particular search term in the third capitalization characteristic class, identifying, from the plurality of documents, each document that comprises the particular search term in either (a) all upper case letters or (b) having the same sequence of upper and lower case letters.

2. A method of claim 1, wherein the method is performed by one or more processors that execute instructions, and wherein the plurality of documents are stored or cached locally on a computer-readable medium that is accessible to the one or more processors.

3. A method of claim 1, wherein the method is performed by one or more processors that execute instructions, and wherein the plurality of documents are located on a plurality of locations that are accessible to the one or more processors through a network.

4. A system for performing a text search, the system comprising:

an index that stores a plurality of entries, wherein each entry corresponds to a text item of a document, and wherein at least some of the entries represent information about a capitalization characteristic of a corresponding text item so as to enable a search operation to be performed that specifies a capitalization criteria;

a document retrieval component configured to access at least a first location to identify the plurality of entries from a plurality of documents, wherein the document retrieval component is configured to access a plurality of network locations to identify the plurality of documents; and a module that inspects the plurality of documents to determine a capitalization characteristic of individual text items in each of the plurality of documents, wherein the capitalization characteristic determined by the module corresponds to determining whether an individual text item has no capitalization, partial capitalization, or all capitalization, wherein for each text item that includes the capitalization characteristic of partial capitalization or all capitalization, multiple entries are included in the index to record the capitalization characteristic, wherein for each text item that includes the capitalization characteristic of all capitalization, a first duplicative entry is stored in the index to represent a partial capitalization characteristic of the text item and a second duplicative entry is stored in the index to represent an all capitalization characteristic of the text item; and wherein for each text item that includes the capitalization characteristic of partial capitalization, only a first duplicative entry is stored in the index to represent the partial capitalization characteristic of the text item, wherein the search interface performs the operation by:

for when a search term specifies a criteria of the all capitalization characteristic, the search operation on the index identifies only one or more entries that identify one or more documents containing matching text items having the all capitalization characteristic of the search term;

for when the search term specifies a criteria of the partial capitalization characteristic, the search operation on the index identifies only one or more entries that identify one or more documents containing matching text items having either the all capitalization characteristic or the partial characterization characteristic; and for when the search term specifies a criteria with no capitalization characteristic, the search operation on the index identifies any entry that represents matching text items having any of the all capitalization characteristic, partial characterization characteristic, or no capitalization characteristic.

5. The system of claim 4, further comprising a search interface to handle a request that includes the capitalization criteria.

6. A computer-readable medium carrying instructions for performing a text search, the instructions including instructions, that when executed by one or more processors, cause the one or more processors to perform steps comprising:

performing a case-sensitive search of a plurality of documents by determining a class of a capitalization characteristic of a search term and using the class to identify documents in a library that contain individual terms with corresponding capitalization characteristics of the class, the case-sensitive search comprising:

receiving one or more search terms;

making a determination of whether each character in each of the one or more search terms is capitalized;

determining, based on the capitalization of each character in each of the one or more search terms, a capitalization characteristic class, of a set of two or more capitalization characteristic classes, for each of the one or more search terms; and identifying, from a plurality of documents, one or more documents based at least in part on the determination of the capitalization characteristic class for each of the one or more search terms, wherein a first capitalization characteristic class, of the set of two or more capitalization characteristic classes, is associated with search terms having all lower case letters, wherein a second capitalization characteristic class, of the set of two or more capitalization characteristic classes, is associated with search terms having all upper case letters, wherein identifying comprises, for a particular search term in the first capitalization characteristic class, identifying, from the plurality of documents, each document that comprises one or more of: (a) the particular search term in all upper case, (b) the particular search term in all lower case, and (b) the particular search term having at least one character in upper case and at least one character in lower case, and wherein identifying comprises, for a particular search term in the second capitalization characteristic class, identifying, from the plurality of documents, each document that comprises the particular search term in all upper case, wherein the set of two or more capitalization characteristic classes includes a third capitalization characteristic class, wherein the third capitalization characteristic class is associated with search terms having at least one character in user case and at least one character in lower case, and wherein identifying comprises, for a particular search term in the third capitalization characteristic class, identifying, from the plurality of documents, each document that comprises the particular search term in either (a) all upper case letters or (b) having the same sequence of upper and lower case letters.

\* \* \* \* \*